R
United States Patent Office 3,294,758
Patented Dec. 27, 1966

3,294,758
AMORPHOUS POLYAMIDES FROM A MIXTURE OF AN ALKYL SUBSTITUTED ALIPHATIC DIAMINE AND UNSUBSTITUTED ALIPHATIC DIAMINE
Rudolf Gabler, Zollikerberg, Zurich, Switzerland, assignor to W. R. Grace & Co., Cambridge, Mass., a corporation of Connecticut
No Drawing. Filed Aug. 8, 1963, Ser. No. 300,936
Claims priority, application Germany, Aug. 14, 1962, G 35,713
4 Claims. (Cl. 260—78)

This invention relates to linear copolyamides which are resistant to boiling water and which can be used as molding, coating or adhesive compositions as well as to a process of preparing them.

Polyamides have been prepared, as described in U.S. Patent No. 2,752,328 by condensing terephthalic acid with diamines which possess one or at most two methyl groups in the side chain, as for example, the various isomers of monomethyl- or dimethyl-hexamethylene diamines, monomethyl- or dimethyl-heptamethylene diamines and monomethyl- or dimethyloctamethylene diamines. These polyamides have a high melting point, i.e. above 250° C., as well as a high initial tensile modulus. However, they are hard, brittle and wiry materials that are undesirable for the preparation of products which require a certain elasticity and plasticity such as foils, ribbons, tubes, and cable coverings.

Valuable polyamides having good plastic and elastic properties can be obtained by condensing a terephthalic acid, isophthalic acid or mixtures thereof, with a substituted polymethylene diamine having a straight chain of at least 6 methylene groups, said chain being substituted by at least one alkyl group, the total number of side chain carbon atoms introduced by the alkyl substitution being at least 3. These polyamides contain recurring units having the following structure:

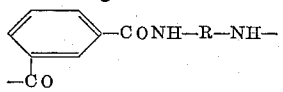

wherein R is a straight chain of at least 6 methylene groups, said chain being substituted by at least one alkyl group, the total number of side chain carbon atoms introduced by the alkyl substitution being at least 3. A typical example of this polyamide class is the polycondensate of terephthalic acid and trimethylhexamethylene diamine. The latter is obtained from isophorone via trimethyladipic acid and its nitrile as a mixture of the isomeric 2,2,4- and 2,4,4-trimethyl-hexamethylene diamines.

These polyamides possess a number of outstanding properties which render them particularly suitable as constructral materials. Such properties include high strength values, glass clear appearance and solubility in cheap commercial solvents.

An inherent disadvantage of these polyamides is their limited stability in boiling water. When injection-molded or casted rods, plates or other shaped articles of these polyamides are immersed in boiling water for several days, blisters or fissures are formed on their surfaces which, upon prolonged boiling, advance deeper into the materials. In addition, these articles are deformed by the boiling water and cannot be used thereafter.

According to the instant invention, the stability of these polyamides in boiling water can be significantly improved if a portion of the substituted polymethylene diamine employed in producing the polyamide is replaced with an unbranched, unsubstituted polymethylene diamine of the same chain length.

Briefly stated, the present invention comprises a process for the production of a linear copolyamide of an aromatic dicarboxylic acid selected from the group consisting of terephthalic acid, isophthalic acid and mixtures thereof, which comprises condensing said aromatic acid with a substantially equimolar proportion of a mixture of aliphatic diamines, said mixture being comprised of about 95 to 70 percent by weight of a substituted polymethylene diamine having a straight hydrocarbon chain of at least 6 carbon atoms, said straight chain being substituted by at least one alkyl group, the total number of side chain carbon atoms introduced by alkyl substitution being at least 3, and about 5 to 30 percent by weight of an unsubstituted polymethylene diamine of the same chain length.

Preferably, the substituted diamine is 2,2,4-trimethyl-hexamethylene diamine, 2,4,4-trimethylhexamethylene diamine or mixtures of these isomeric diamines, and the unsubstituted polymethylene diamine is hexamethylene diamine.

The amount of the unsubstituted polymethylene diamine in the diamine mixture may range from about 5 to 30 percent by weight of the mixture. Amounts of the unsubstituted polymethylene diamine as low as 5 percent by weight of the diamine mixture will produce a copolyamide with a significantly improved resistance to boiling water. The copolyamide formed according to the instant invention does not exhibit any deterioration of its characteristics when compared to a polyamide produced without the unsubstituted polymethylene diamine component. In general, amounts of the unsubstituted polymethylene diamine as high as 30 percent by weight of the diamine mixture may be used to produce the copolyamide without significantly affecting its mechanical, thermal and optical properties. Amounts of the unsubstituted polymethylene diamine in excess of 30 percent by weight of the diamine mixture will produce a more brittle copolyamide which is initially glass clear but becomes somewhat turbid upon prolonged immersion in boiling water.

In preparing the linear copolyamides of the present invention, it is more advantageous to first prepare the salt of the components. This can be accomplished by forming a solution of the terepthalic acid or isophthalic acid or mixtures thereof and preferably an equivalent amount of the diamine mixture, in water. The resulting aqueous salt solution may be used directly for the polycondensation process. If desired, the salt may be crystallized out of solution by the addition of alcohol, methanol or any suitable precipitant. This salt may then be purified by several recrystallizations. It is generally preferable to form the salt of the substituted diamine and the unsubstituted diamine separately and then to mix the salts in the desired proportions prior to polycondensation.

Polycondensation of the salt can be effected in a number of ways. For example, the salt may be dissolved in water at an elevated temperature in a stainless steel vessel which is equipped with a heating element and stirring means and connected to an autoclave. The resulting solution is transferred by nitrogen pressure into the autoclave which has been preheated to a temperature of about 200° C. The solution is then heated in the autoclave. After a few hours the water vapor is released, and the pressure, equalized with atmospheric pressure. The temperature is raised and heating is continued at atmospheric pressure under a continuous stream of nitrogen for several hours. The polycondensation is carried out until copolyamides with a high molecular weight, i.e. preferably greater than 20,000, are obtained. Such high molecular weight copolyamides have an intrinsic viscosity greater than 1.

To produce a copolyamide of a specified molecular weight, monofunctional chain terminators such as acetic acid or stearic acid may be added to the reaction mass. This may also be accomplished by using an excess amount of one of the copolyamide-forming components.

The copolyamides of the present invention can also be prepared at lower temperatures using the boundary surface or interfacial condensation method (United States Patent No. 2,831,834), which consists in mixing, with thorough stirring, equivalent or nearly equivalent quantities of an acid halide, dissolved in a water immiscible solvent such as carbon tetrachloride, and an aqueous solution of the diamine. By this method, the copolyamides are obtained as a finely granular colorless powder.

The copolyamides of the present invention may be produced as colorless, glass clear granules or as white powder depending upon the particular process of polycondensation used. The instant copolyamides may be molded to form a number of shaped articles such as ribbons, pipes, plates, foils and tubes. These articles are highly stable in the presence of boiling water.

Unless otherwise stated, all parts herein are parts by weight.

This invention is further illustrated by the following examples:

Example I 166 parts of terephthalic acid were mixed with 200 parts of water in a stainless steel pressure vessel. The air was then displaced with nitrogen and about 140.4 parts of a substituted diamine comprised of about a 1:1 blend of the isomeric 2,2,4- and 2,4,4-trimethylhexamethylene diamines were added. This substituted diamine was also used in all of the subsequent examples. 11.6 parts of hexamethylene diamine were also added. The mixture was heated to 70–80° C. and stirred until a solution was obtained.

By means of nitrogen pressure, the salt solution was passed through a filter into an autoclave which had been preheated to a temperature of 200° C. The temperature was then raised to 240° C. At the end of 2 hours, the water vapor was released and pressure equalization with atmospheric pressure was obtained.

The melt was then heated at atmospheric pressure at a temperature in the range of 260–265° C. over a period of 16 hours.

The resulting melt was extruded into cold water by means of nitrogen pressure so as to form cylindrical rods of the copolyamide. The rods were water clear.

The rods were granulated, melted and injection molded into test pieces which were used in a series of standard tests to determine the physical and mechanical properties of the copolyamide.

A polyamide was also formed in the same manner as described above except that the substituted polyhexamethylene diamine alone was used. The physical and mechanical properties of this polyamide were tested in the same manner as the copolyamide.

The results of these tests are shown in Table I.

TABLE I

| Property | Polyamide using only substituted polymethylene diamine (1:1 blend of 2,2,4- and 2,4,4-trimethylhexamethylene diamines) | Copolyamide of Example I using approx. 90% by wt. of substituted polymethylene diamine (1:1 blend of 2,2,4- and 2,4,4-trimethylhexamethylene diamines) and approx. 10% by wt. hexamethylene diamine |
|---|---|---|
| Melting range | 190–220° C | 190–220° C. |
| Vicat temperature | 143° C | 143° C. |
| Yield Stress | 850 kg./cm.² | 842 kg./cm.² |
| Elongation at break | 30–80% | 33–96%. |
| Ball indentation hardness (60 sec.) | 1,440 kg./cm.² | 1,430 kg./cm.² |
| Impact strength | 8.3 cm.-kg./cm.² | 9.1 cm.-kg./cm.². |
| Bending stress limit | 1250 kg./cm.² | 1,215 kg./cm.². |
| Optical properties | Colorless, glass clear | Colorless, glass clear. |
| Appearance after immersion in boiling water for 3 days. | Blisters and fissures on the surface. | Unchanged. |
| Appearance after immersion in boiling water for 10 days. | Blisters and fissures throughout the material, deformations. | Do. |

Table I illustrates that the copolyamide produced with hexamethylene in an amount as little as 10 percent by weight of the diamine mixture is highly resistant to boiling water as compared to the polyamide produced without hexamethylene diamine. In addition, Table I illustrates that the copolyamide displays no deterioration of its other properties.

Example II 166 parts of terephthalic acid were mixed with 200 parts of water in a stainless steel pressure vessel. The air was then displaced with nitrogen and 132.8 parts of the substituted diamine of Example I and 17.4 parts of hexamethylene diamine were added. The mixture was heated to 70–80° C. and stirred until a solution was obtained.

The solution was then filtered into 4 liters of methanol having a temperature of 60° C. and allowed, with stirring, to cool slowly whereupon the terephthalic acid diamine salts separated out. The mixture was cooled to −10° C. for 3 hours. The salt was then filtered off. The yield was 90 to 95 percent of the theoretical value.

The salt was dried and then dissolved in an equivalent amount of water in a stainless steel pressure vessel at 170–180° C. By means of nitrogen pressure, the salt solution was passed into an autoclave which had been preheated to a temperature of 200° C. The temperature was then raised to 240° C. At the end of 4 hours, the water vapor was released and pressure equalization with atmospheric pressure was obtained.

The melt was heated at atmospheric pressure at a temperature in the range of 270–275° C. over a period of 16 hours.

The viscous melt was then extruded into cold water by means of nitrogen pressure so as to form cylindrical rods. The rods were passed to a granulator. The resulting granulate was glass clear. It has an intrinsic viscosity (measured in concentrated sulfuric acid at 20° C.) of 1.1.

The granules were injection molded to form test rods. These test rods were immersed in boiling water for 10 days. At the end of this period, they showed no visible change.

Example III

The salt of 166 parts of terephthalic acid and 156 parts of the substituted diamine was formed as set forth in Example II. The salt of 166 parts terephthalic acid and 116 parts of hexamethylene diamine was also prepared as set forth in Example II. Each salt was recrystallized twice from a methanol/water solution.

145 parts of the salt of the terephthalic acid and the substituted diamine, 14.1 parts of the salt of terephthalic acid and hexamethylene diamine and 0.2 part of stearate acid (chain terminator) were dissolved in 150 parts of water in a stainless steel pressure vessel at 170–180° C.

By means of nitrogen pressure, the resulting salt solution was passed through a filter into an autoclave which had been preheated to a temperature of 200° C. The temperature was then raised to 240° C. At the end of 4 hours, the water vapor was released and pressure equalization with atmospheric pressure was obtained.

The melt was then heated at atmospheric pressure at a temperature of 280° C. for 16 hours.

The melt was then extruded into cold water by means of nitrogen pressure so as to form cylindrical rods. The polyamide was clear and colorless. It had an intrinsic viscosity (measured in concentrated sulfuric acid at 20° C.) of 1.25.

Shaped articles formed from the polyamide were immersed in boiling water for 3 weeks. At the end of this period, they displayed a slight crystalline clouding but no blisters, fissures or other deformations.

Example IV 81.2 grams of a mixture of terephthalic acid dichloride and isophthalic acid dichloride containing about 8 percent of the isophthalic acid dichloride were dissolved in 4 liters of carbon tetrachloride with stirring in an enameled mixer having a capacity of 30 liters.

50 grams of the substituted diamine, 10 grams of hexamethylene diamine and 50 grams of potassium hydroxide were dissolved in 4 liters of water. The solution was immediately added to the mixer with vigorous agitation. A white, powdery polyamide precipitated. After 3 minutes, the agitation was stopped and the polyamide was separated from the solvent by centrifugation. By washing the polyamide twice with water in the mixer, the polyamide was obtained free of chlorine. The yield was 85–90 percent of the theoretical value. The polyamide had a melting range of 200–230° C. and an intrinsic viscosity (measured in concentrated sulfuric acid at 20° C.) of 0.95.

The polymer was extruded into an endless rod and then granulated. The resulting glass clear granules were formed into test rods. These rods were immersed in boiling water for several days. At the end of this period, the rods displayed a slight crystalline clouding but there were no visible fissures or blisters or other deformations.

I claim:

1. A linear copolyamide of an aromatic dicarboxylic acid selected from the group consisting of terephthalic acid, isophthalic acid and mixtures thereof and a substantially equimolar amount of a diamine mixture consisting of about 95 to 70 percent by weight of a substituted polymethylene diamine having a straight hydrocarbon chain of at least 6 carbon atoms, said straight chain being substituted by at least one alkyl group, the total number of side chain carbon atoms introduced by alkyl substitution being at least 3, and about 5 to 30 percent by weight of an unsubstituted polymethylene diamine of the same chain length said copolyamide being amorphous and resistant to boiling water.

2. The linear copolyamide of claim 1 wherein the substituted diamine is comprised of a mixture of substantially equivalent amounts of 2,2,4- and 2,4,4-trimethyl hexamethylene diamines and the unsubstituted polymethylene diamine is hexamethylene diamine.

3. A heat shaped cylindrical rod formed from the copolyamide of claim 1.

4. A heat shaped cylindrical rod formed from the copolyamide of claim 2.

References Cited by the Examiner

UNITED STATES PATENTS

| | | | |
|---|---|---|---|
| 2,742,496 | 4/1956 | Lum et al. | 260—78 |
| 2,752,328 | 6/1956 | Magat | 260—78 |
| 2,766,221 | 10/1956 | Lum et al. | 260—78 |
| 2,864,807 | 12/1958 | Nobis et al. | 260—78 |
| 2,902,475 | 9/1959 | Burkhard | 260—78 |

WILLIAM H. SHORT, *Primary Examiner.*

H. D. ANDERSON, *Assistant Examiner.*